March 10, 1936.  L. B. HARVEY ET AL  2,033,827
INSULATOR FORMING MACHINE
Filed Feb. 28, 1931  11 Sheets-Sheet 4
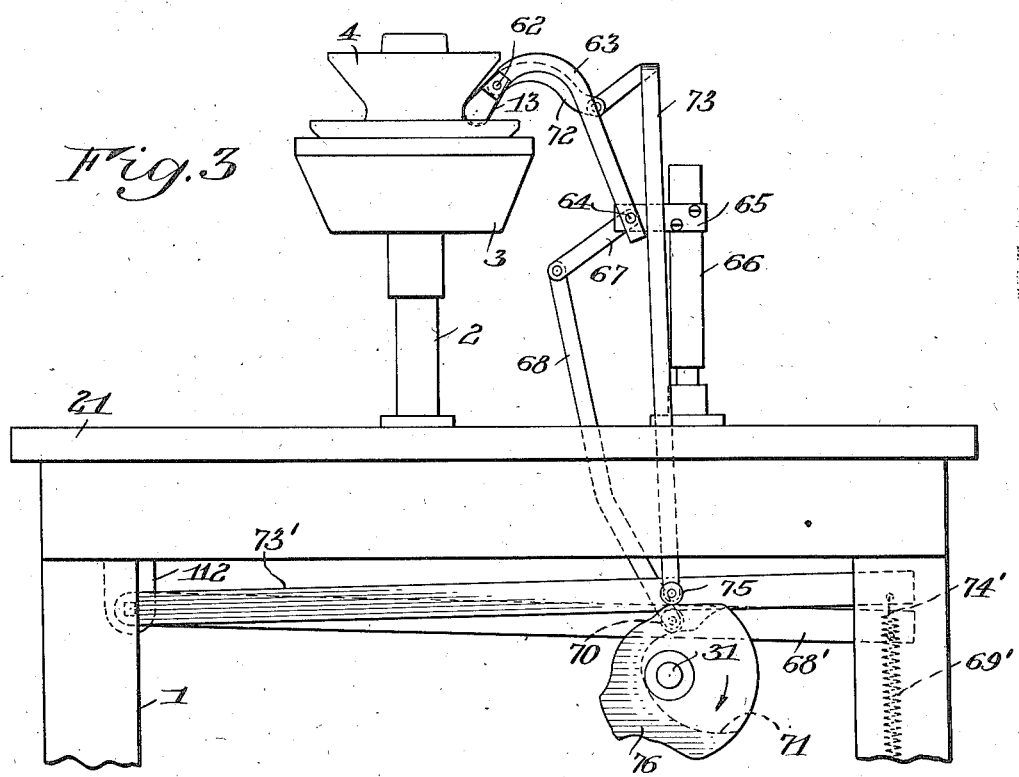
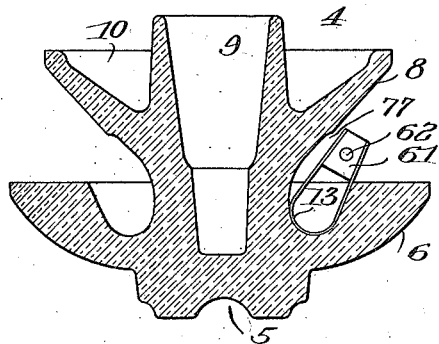
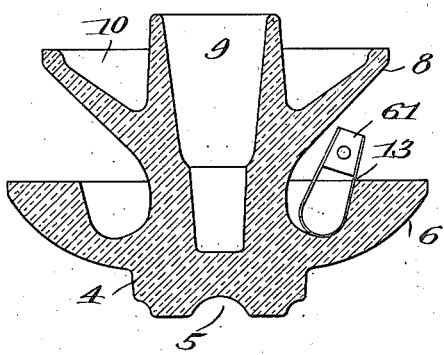
INVENTORS
Leo B. Harvey
Lucius L. French
BY
Harold E. Stonebraker
Their ATTORNEY

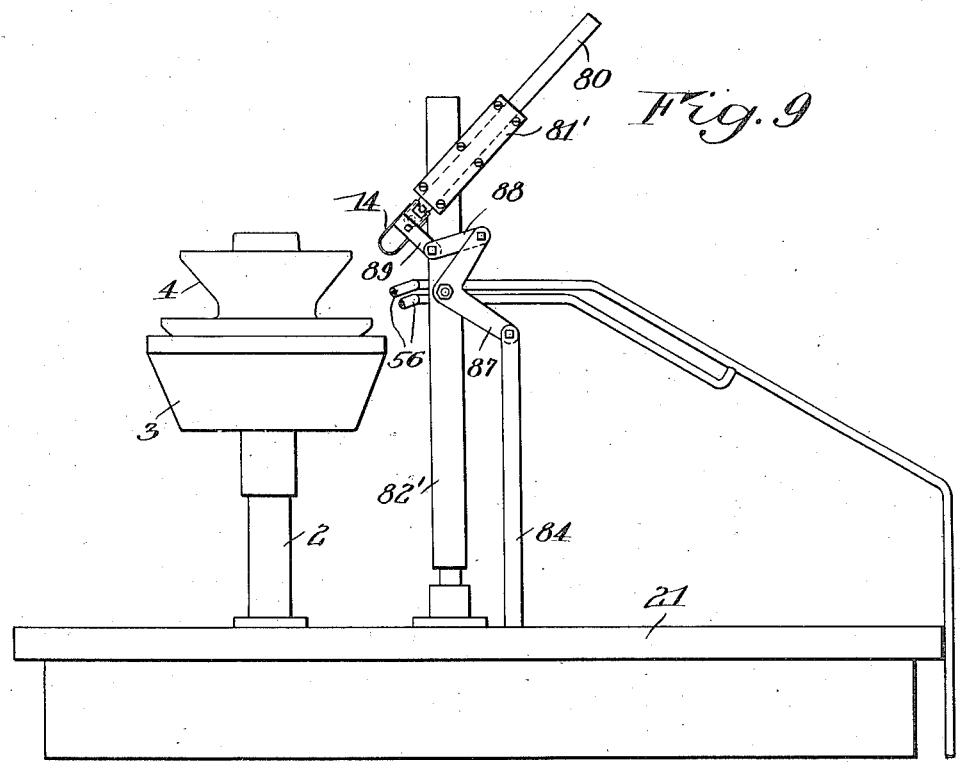
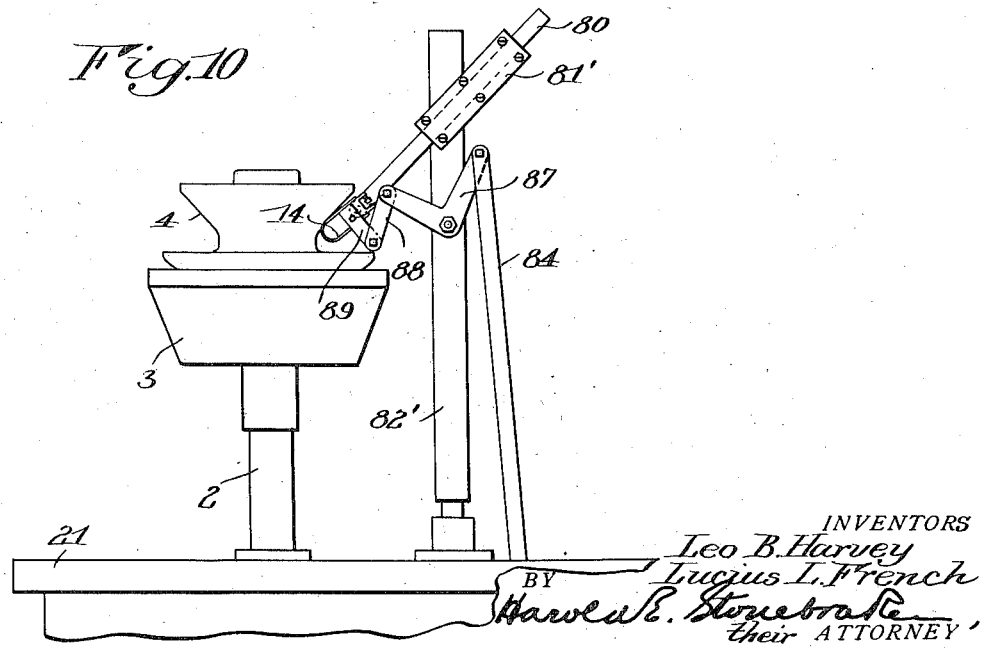

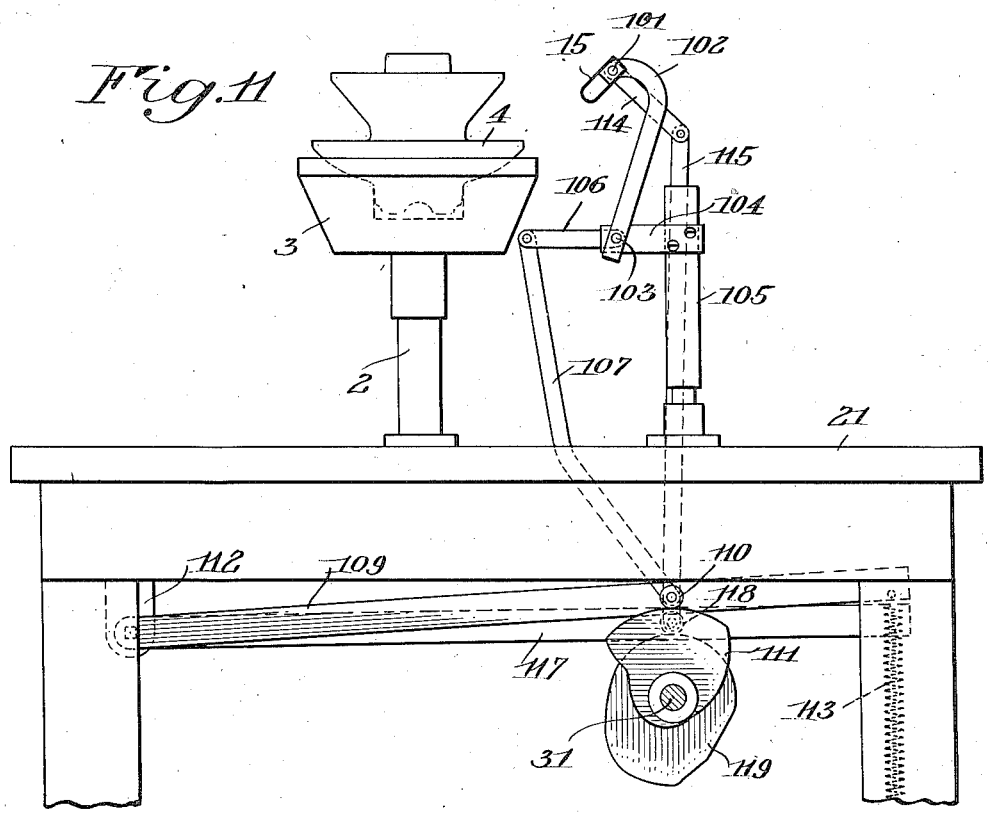
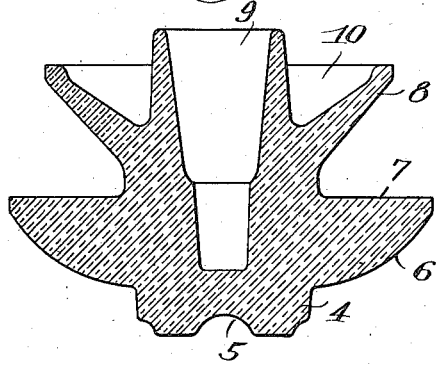
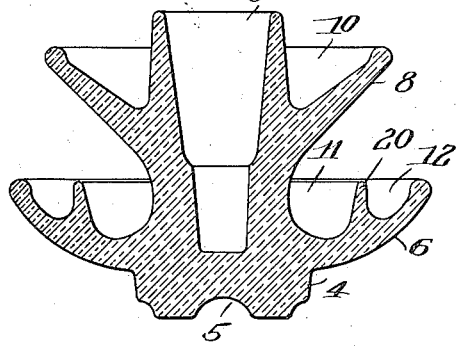

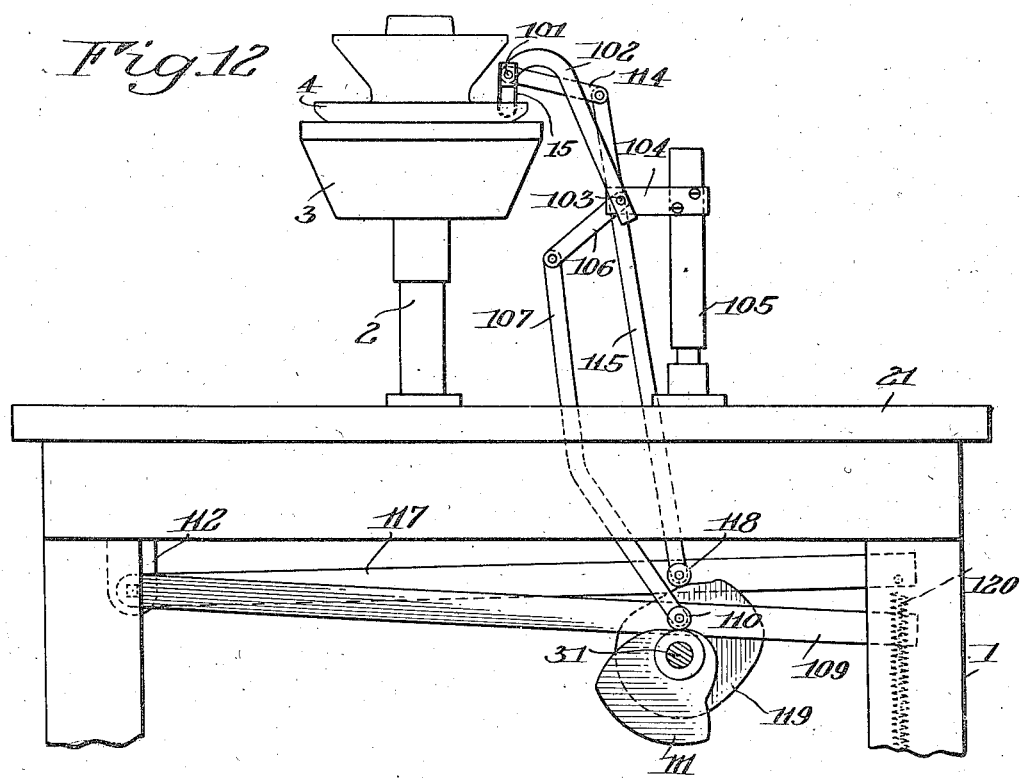
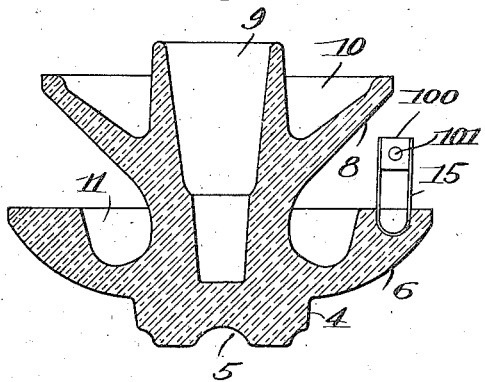
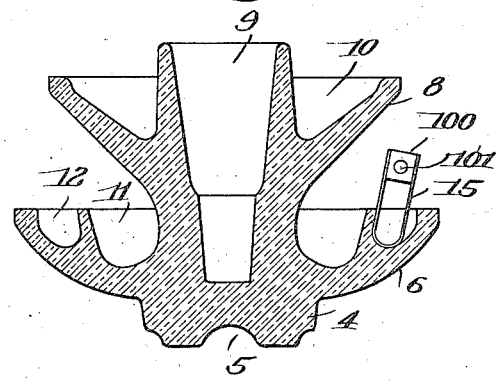

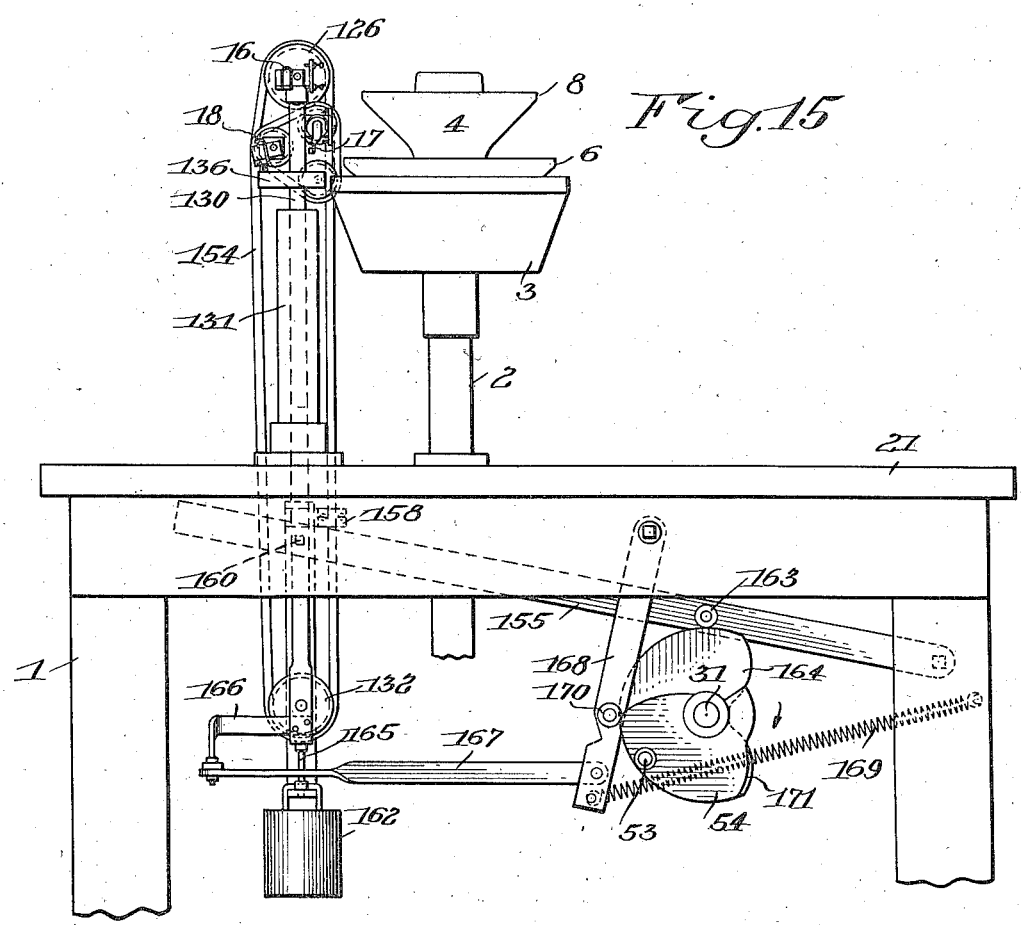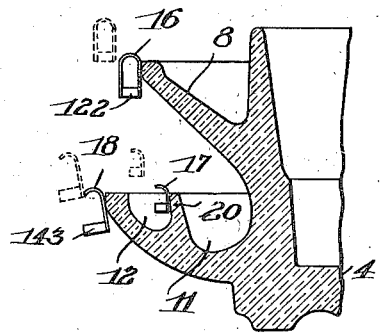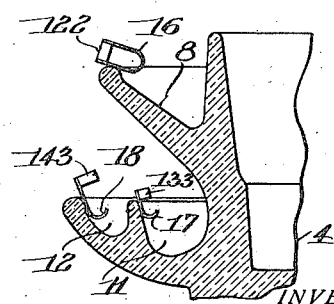

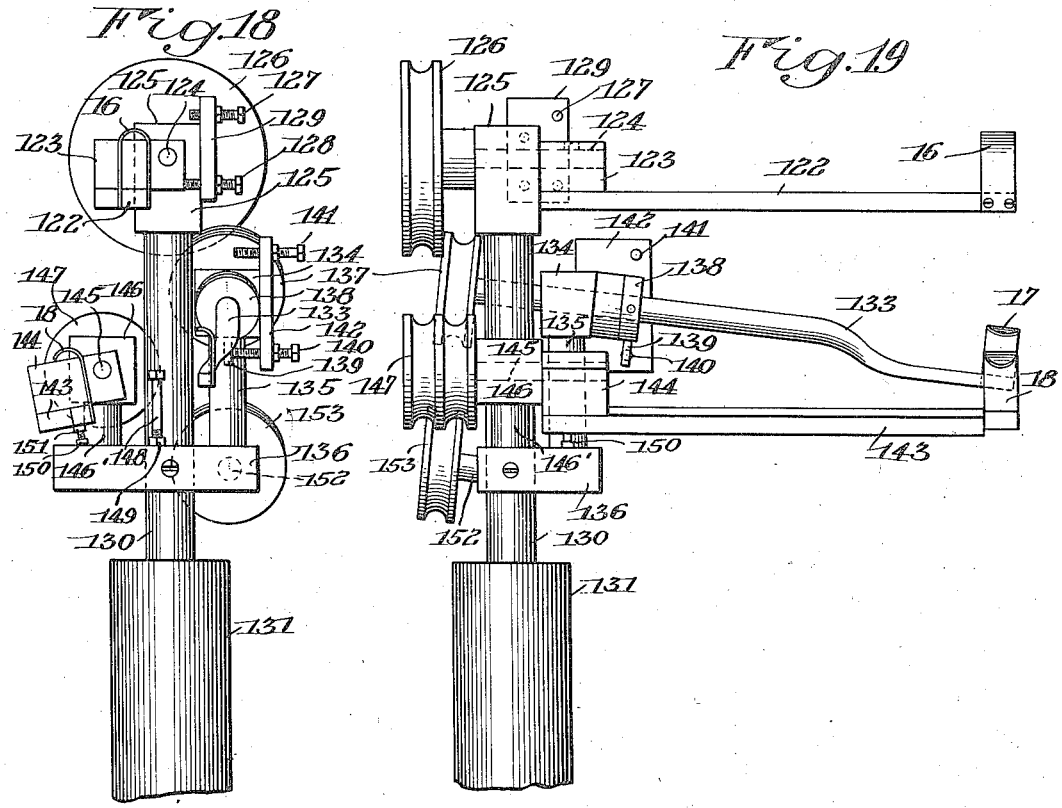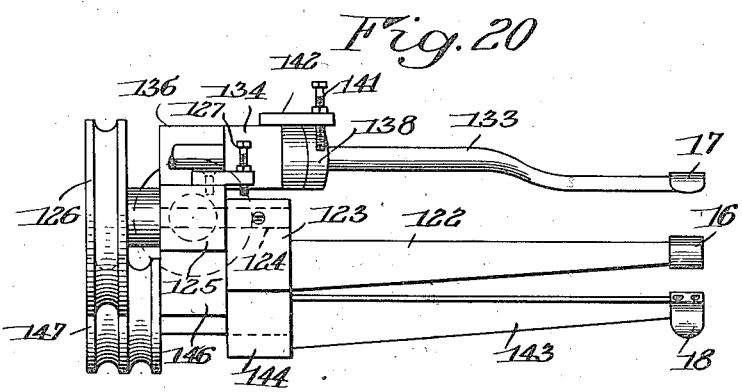

March 10, 1936.    L. B. HARVEY ET AL    2,033,827
INSULATOR FORMING MACHINE
Filed Feb. 28, 1931    11 Sheets-Sheet 10
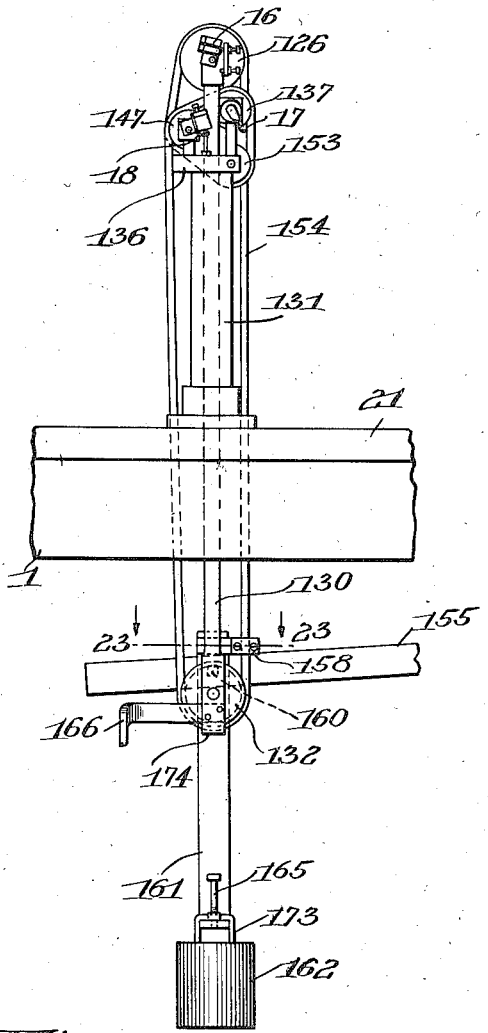
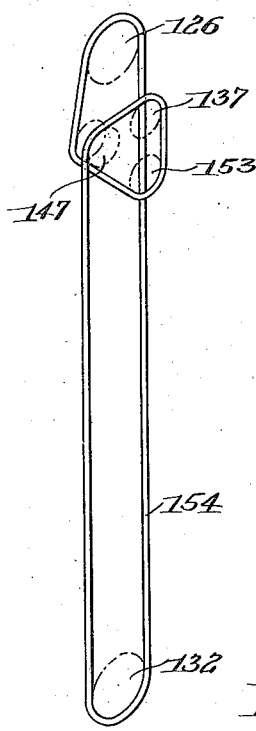
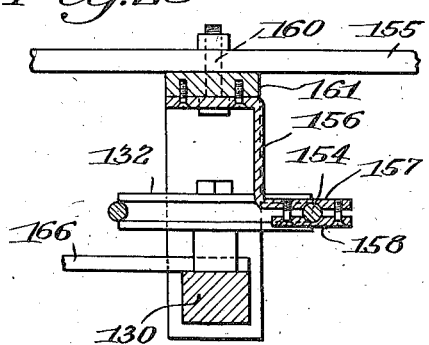
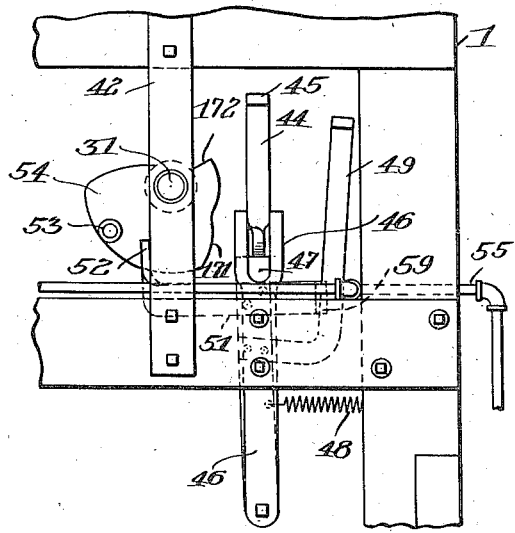
INVENTORS
Leo B. Harvey
Lucius L. French
BY Harold E. Stonebraker
their ATTORNEY

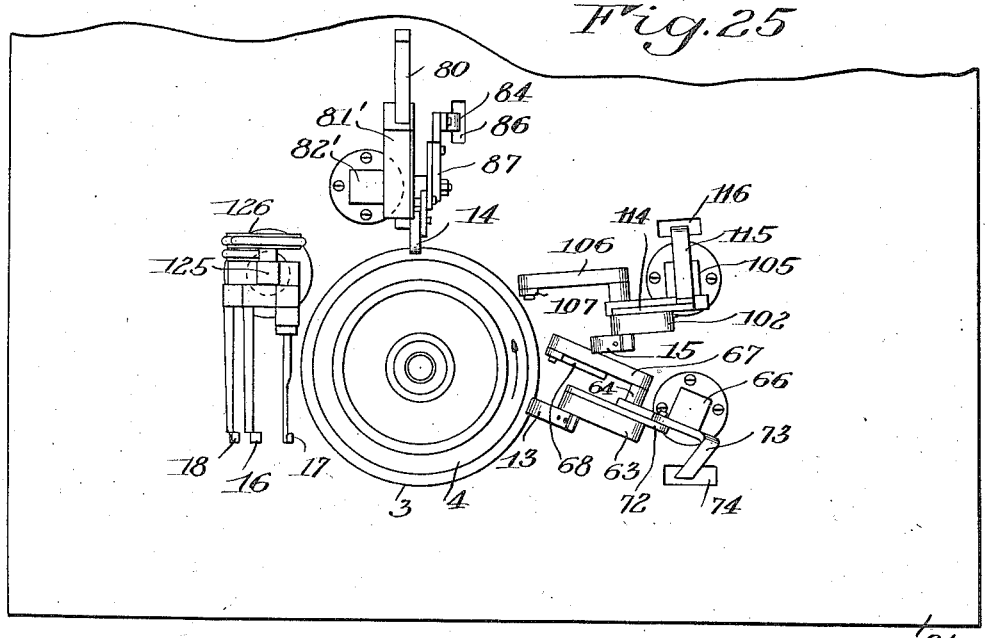

Patented Mar. 10, 1936

2,033,827

UNITED STATES PATENT OFFICE 2,033,827

INSULATOR FORMING MACHINE

Leo B. Harvey, Lima, and Lucius L. French, Rochester, N. Y., assignors to The Porcelain Insulator Corporation, Lima, N. Y., a corporation of New York Application February 28, 1931, Serial No. 519,002

37 Claims. (Cl. 25—3)

This invention relates to machines for forming insulators, and particularly high tension insulators which are made of porcelain in a single piece. In the past, such insulators have been made by molding or pressing the clay to form a blank, the grooves in the skirt being afterwards formed by turning the blank and cutting the grooves and finishing the insulator with manually operated tools. This process was slow, and resulted in a more or less non-uniform product.

The principal object of this invention is to provide a machine of this class which is simple in construction, inexpensive to make, and by which the skirts of an insulator can be quickly formed from a blank, resulting in a more uniform product than has heretofore been possible.

Another object of the invention is to provide a machine of this kind adapted to cut the grooves in the skirt of an insulator blank, in which the clay can be worked by thin steel cutters which are less expensive and longer lived than forged cutters heretofore used.

Still another object of the invention is to provide a machine of this kind having means for turning an insulator blank, a plurality of cutters, and means for automatically controlling and moving the cutters to perform certain desired cutting operations on the blank.

A still further object of the invention is to provide a machine of this kind with means for directing a blast of compressed air on the cutters while operatively in engagement with the work piece to blow the fragments of clay produced thereby from the blank to keep the surface smooth and free from any adhering clay particles.

Another object of the invention is to provide a machine of this kind having means for turning an insulator blank with a plurality of cutters for operating thereon and a plurality of movable cams for controlling the cutters.

To these and other ends, the invention consists in the construction and arrangement of parts that will appear from the following description when read in conjunction with the accompanying drawings, the novel features being pointed out in the claims at the end of the specification.

In the drawings:

Fig. 3 is a front elevation showing one of the cutters in operative engagement with a work piece, parts being broken away and others removed for clearness;

Fig. 4 is an enlarged central vertical section of an insulator blank showing the cutter illustrated in Fig. 3 in operative engagement therewith;

Fig. 5 is a similar view showing the position of the cutter at the completion of its cutting operation;

Fig. 9 is a side elevation of the cutter shown in Fig. 6 showing its position relative to the insulator blank when in normal inoperative position, this view also showing devices for directing an air blast onto the work piece;

Fig. 10 is a similar view showing the position of the cutter at the completion of its cutting operation and just before being relieved from the work piece;

Fig. 11 is a front elevation showing another cutter in normal inoperative position, parts being broken away to conserve space and others removed for clearness;

Fig. 12 is a similar view of the same showing the position of the cutter in operative engagement with the work piece;

Fig. 13 is an enlarged central vertical section of an insulator blank showing the cutter of Fig. 12 just after moving into engagement therewith;

Fig. 14 is a similar view showing the position of the cutter at the completion of its cutting operation and before withdrawing from the work piece;

Fig. 15 is a front elevation showing a group of finishing cutters, parts being broken away to conserve space and others removed for clearness;

Fig. 16 is an enlarged fragmentary detail view showing the finishing cutters moved into engagement with the work piece, a previous position being indicated in dotted lines;

Fig. 17 is a similar view showing the position of the cutters at the end of their cutting stroke;

Fig. 18 is an enlarged fragmentary front elevation illustrating the mounting of the cutters shown in Fig. 15;

Fig. 19 is a side elevation of the same;

Fig. 20 is a plan view of the same;

Fig. 21 is a fragmentary elevation of the finishing cutters shown in Fig. 15, showing parts moved to another position under the action of one of its controlling cams, the operative connection with another cam being broken away for clearness;

Fig. 22 is a diagrammatic view of the endless belt for actuating the finishing cutters;

Fig. 23 is a fragmentary section of a detail slightly enlarged taken substantially on line 23—23 of Fig. 21;

Fig. 24 is a fragmentary detail view showing manually operated devices for controlling the machine;

Fig. 25 is a fragmentary plan view showing the relation of all the cutters to the work piece;

Fig. 26 is a similar view showing the finishing cutters moved to another position, the other cutters being sectioned away, this view also showing the air blast tubes behind the work piece;

Fig. 27 is an enlarged transverse vertical section of the work piece or insulator blank, and Fig. 28 is a similar view of the finished insulator.

Figure 1:
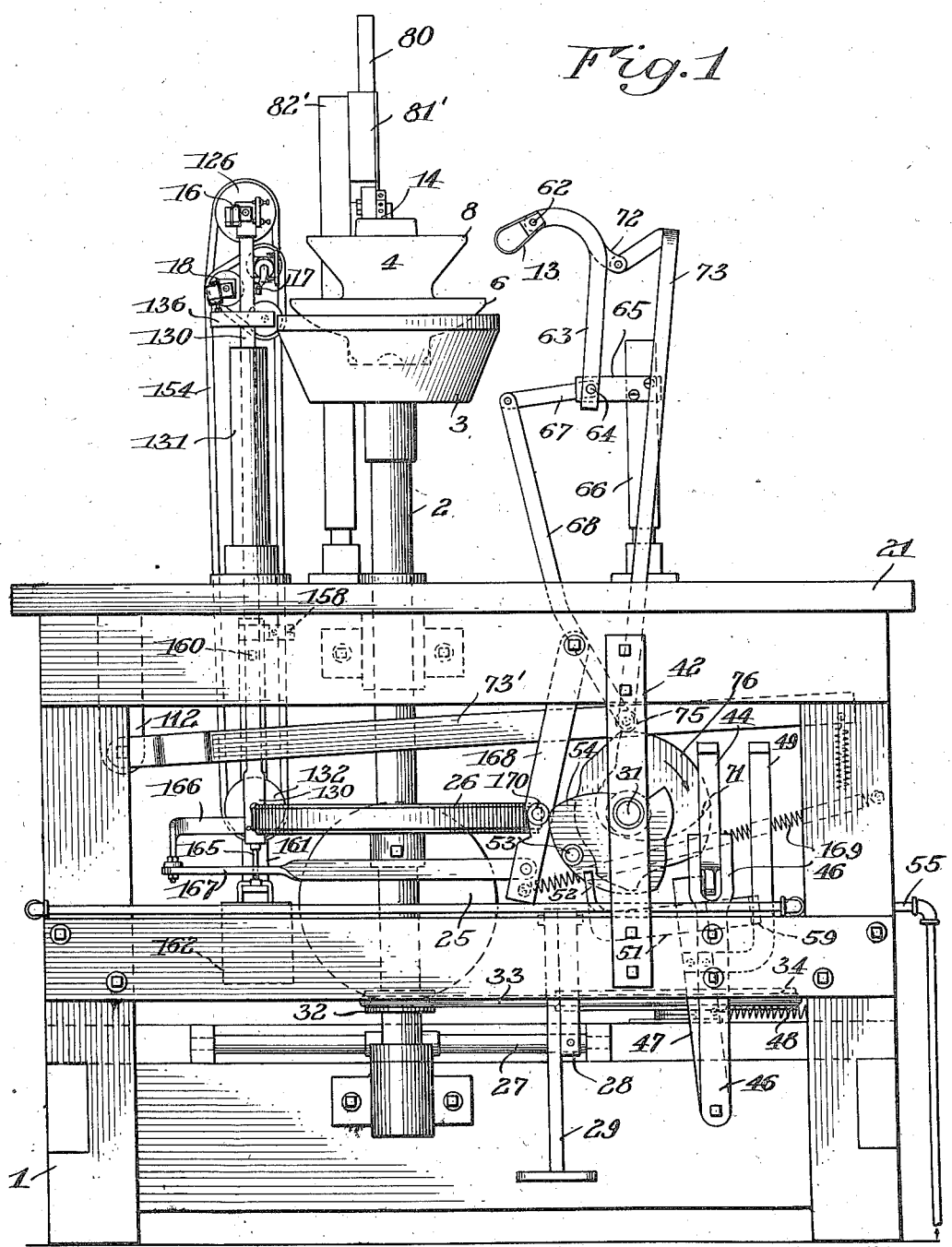
Fig. 1 is a front elevation of an insulator forming machine constructed according to one possible embodiment of the invention.

Referring particularly to the drawings in which like reference numerals refer to the same part in all the views, 1 refers generally to the frame of the machine in which a centrally located vertical shaft 2 is revolubly mounted. At its upper end, the shaft 2 carries a work holder in the form of a chuck 3 in which a work piece in the form of an insulator blank 4 may be mounted to turn therewith. The insulator blank is formed of clay and molded in the form shown in Fig. 27. The blank is shown in inverted position, in which position it is mounted in the chuck to be operated on by the cutters. As shown in said figure, the blank comprises a conductor groove 5 adjacent to which is a wide skirt 6 having a plane upper surface 7, as viewed in the drawings, and above the skirt 6 is a second narrower skirt 8 formed by an upwardly and outwardly projecting wall of conical formation. Formed centrally of the blank is the usual pin hole 9, a groove 10 being formed between the skirt 8 and the upper or open end of the pin hole. In Fig. 28, the finished insulator is shown having inner and outer grooves 11 and 12 formed in the upper face of the skirt 6, separated by an inner flange 20.

Six knives or cutters are provided for operating on the work piece. The arrangement of these is best shown in Fig. 25, and in the order of actuation, 13 is an inner groove cutter, 14 an inner groove and lower skirt finishing cutter, 15 an outer groove cutter, 16 a lower skirt finishing cutter, 17 an inner flange finishing cutter, and 18 an outer flange finishing cutter. These cutters are actuated into operation with the work piece successively in the order named except that the three last named cutters, 16, 17 and 18, are actuated simultaneously in unison. It will be understood, however, that the arrangement of the cutters or the order in which they are actuated or begin to operate may be varied as desired without departing from the spirit or scope of the invention.

These cutters are arranged circumferentially about the shaft 2 and mounted on the table or top 21 of the frame. The shaft 2 is driven by power derived from a motor 22 which may be mounted on a shelf 23 in the rear lower part of the frame 1. Splined on the shaft of the motor is the hub 24 of a drive wheel 25 adapted to slide forwardly into frictional engagement with the periphery of a wheel 26 fixed on the shaft 2.

A rock shaft 27 is rotatably mounted in the frame and operatively connected with the wheel 25 through tongue and groove connections. When the shaft 27 swings in one direction, the wheel 25 moves into driving engagement with the wheel 26 and rotates the shaft 2; when it swings in a rearward direction, the wheel 25 is disengaged from the wheel 26 and its shaft 2 and the work holder mounted thereon is permitted to come to rest.

Foot controlled means are provided for actuating the rock shaft 27. Said means comprises an arm 28 fixed on the rock shaft 27 and having its free end secured to a foot piece 29 extending forwardly to the front of the machine. A spring 30 connects the arm 28 with a fixed part of the frame and resiliently maintains the rock shaft in normal position with the driving wheel 25 out of engagement with the driven wheel 26. The wheel 26 may be adjusted longitudinally of the shaft 2 for changing its speed of rotation in a well known manner.

Figure 2:
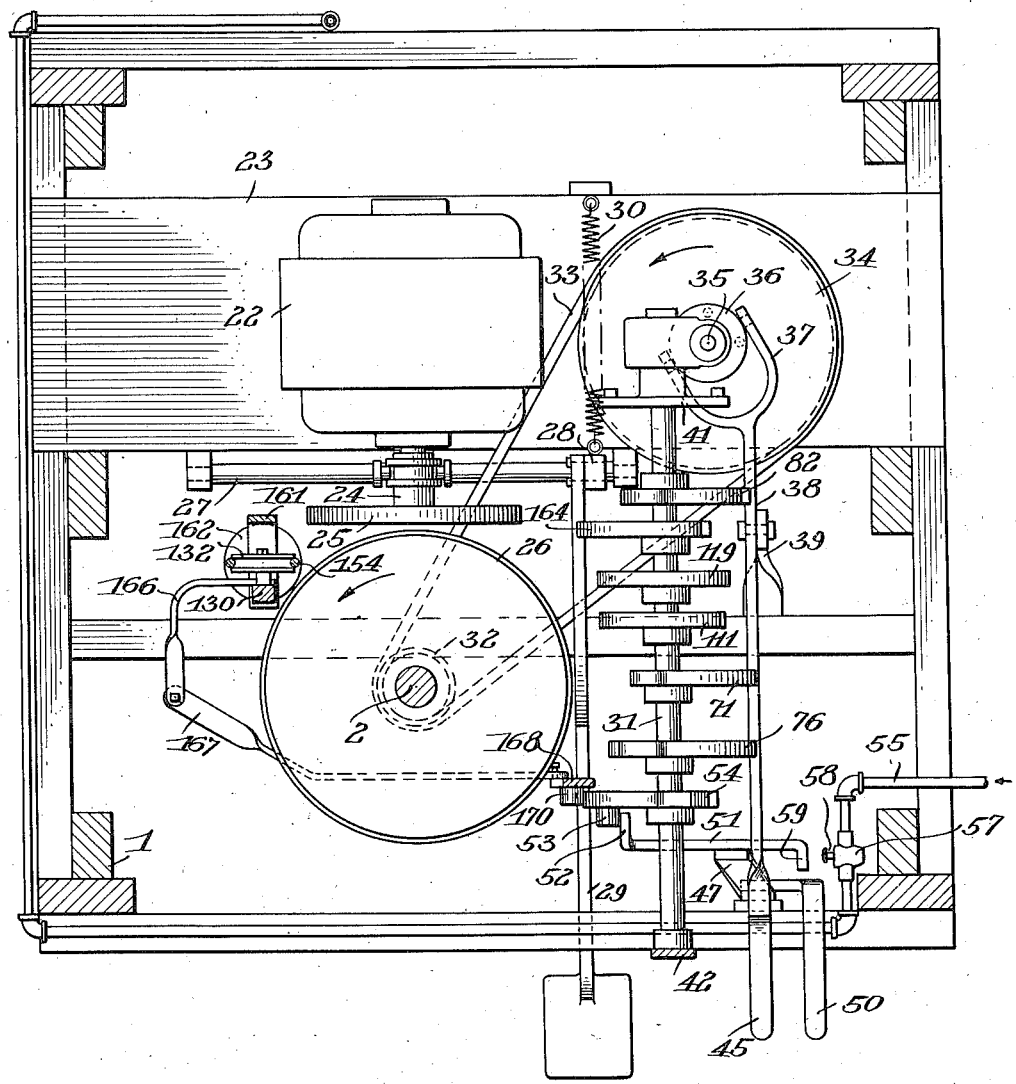
Fig. 2 is a horizontal section of the same showing the mechanism beneath the table.
Figure 6:
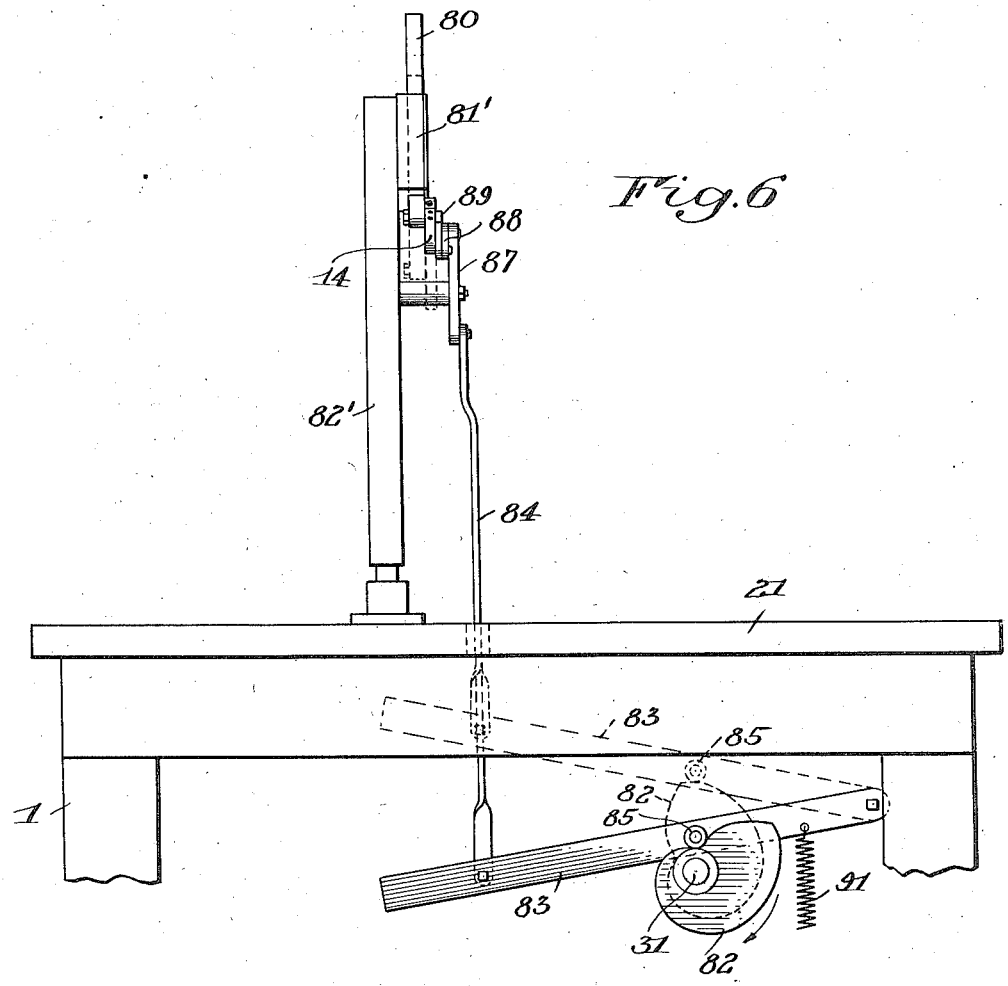
Fig. 6 is a front elevation showing another cutter and the devices for controlling the same, parts being broken away to conserve space and others being removed for clearness, a second position of the actuating cam being shown in dotted lines.
Figure 7:
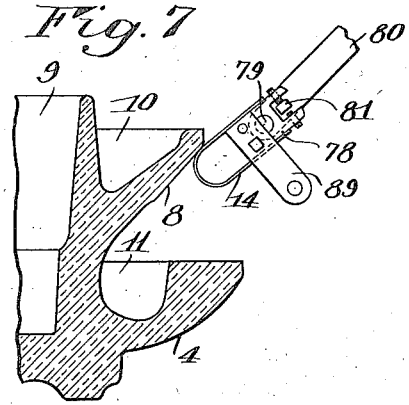
Fig. 7 is an enlarged fragmentary view of the same showing the position of the cutter moved into engagement with the insulator blank.
Figure 8:
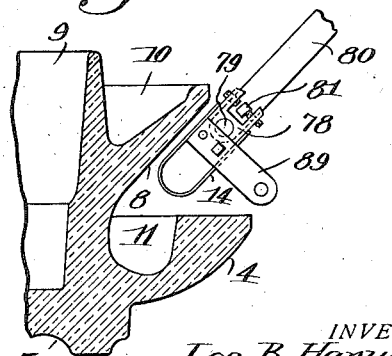
Fig. 8 is a similar view showing the position of the cutter at the termination of its cutting operation and relieved from the insulator blank but before its return movement to normal position.

The cutters are preferably controlled by means of cams, and in the embodiment illustrated a plurality of cams are provided for this purpose, all mounted on a single cam shaft 31, see Fig. 2. It will be understood, however, that the cams might be otherwise arranged and other means employed for actuating the cutters. The shaft 31 is horizontally arranged in the frame and rotatably mounted therein, devices being provided for operatively connecting it with the shaft 2 to be driven thereby. To this end, a pulley 32 is fixed to the shaft 2 and connected by a flexible endless belt 33 with a pulley 34 rotatably mounted on a stub shaft 35. A clutch member 36 is splined on the stub shaft and movable into engagement with a companion clutch member on the hub of the pulley 34 for connecting the shaft to the pulley to be rotated thereby. The clutch member 36 is provided with a circumferential groove engaged by the forked end 37 of a hand lever 38 pivoted on a bracket 39 on the frame of the machine. Secured to or formed integral with the stub shaft 35 is a worm which engages a worm wheel, not shown, fixed on the shaft 31, and provides a reduced speed gear between the shaft 35 and the cam shaft 31. The cam shaft 31 has bearings in brackets 41 and 42 mounted on the frame.

A plurality of spaced cams, seven being employed in the present instance, are secured on the cam shaft 31 and operate to control the cutters and the air blast and also to automatically stop the cam shaft when the operations on a work piece are complete. Referring to Figs. 1, 2 and 24, it will be noted that the lever 38 has an upwardly projecting portion 44 at its front end which is bent forwardly to provide a finger piece 45, whereby the lever may be moved rearwardly to engage the clutch devices to operatively connect the cam shaft 31 with the driven wheel 34 to be rotated thereby. Means are provided for automatically locking the lever 38 in position to maintain the parts of the clutch engaged. To this end, the forward end of the lever is guided in the bifurcated upper end of a bracket 46 secured to the frame. Pivoted to the lower end of this bracket to swing in a vertical plane is a locking dog in the form of an arm 47 normally in the position shown in Figs. 1 and 2, engaging one side of the lever 38 but adapted to swing to locking position shown in Fig. 24 under the action of its spring 48 when the lever 38 is actuated to close the clutch, and in which position it engages the lever to maintain the clutch closed. When the locking dog is again moved laterally out of engagement with the lever 38, said lever moves by gravity, owing to the length of its front arm, to disengage the clutch to stop the cam shaft. If desired, however, the lever 38 may be connected to the frame by a spring for resiliently moving it to disengage the clutch when released by the locking dog.

Both automatic and manually actuated means are provided for releasing the locking dog from the lever 38, the automatic devices being brought into operation when the operations on a work piece are complete, and the manually actuated devices being operable to stop the operation of the cam shaft at any time. To this end, an arm 49 is secured to the locking dog 47 and projects laterally therefrom and is bent upwardly and then forwardly to provide a finger piece 50 at its upper end. When the finger piece 50 is moved laterally, the dog 47 swings on its pivot to release the lever 38. A dog 51 is also secured to the locking dog and projects laterally therefrom in both directions. At one end, the dog 51 has a finger 52 projecting at right angles thereto into the path of a lug 53 on a cam 54 on the cam shaft 31 when the locking dog is in locking position, but out of the path of said lug 53 when the locking dog is out of locking engagement with the lever 38. When the locking dog moves to lock the lever 38 when the latter is actuated to close the clutch, the finger moves into the path of the lug 53 which moves with the cam 54 as the cam shaft rotates and engages the finger 52 to release the locking dog. The lug 53 is so positioned on the cam that it engages the finger 52 just as the operations on the work piece are complete, and moves the finger out of its path as the locking dog moves to release the lever 38. The lug 53 may be provided with an anti-friction roller bearing, as shown, if desired.

The dog 51 is also operative to control the air blast for blowing chips and fragments of clay from the work piece produced by the operation of the cutters thereon. The air is led through a pipe or conductor 55 from a suitable supply under pressure over the frame of the machine to the discharge nozzles 56, best seen in Figs. 9 and 26. The pipe 55 passes adjacent the end of the dog 51 where it is provided with a valve or cut-off 57 having a slidable valve member 58 normally retained in the closed position shown in Fig. 2 by resilient means, not shown. On the end of the dog 51 opposite the finger 52, the dog is provided with a second finger 59 adapted to engage the valve member 58 and open the valve when the locking member 47 moves to locking position. When, however, the locking member is moved to release the lever 38, the finger 59 moves with it to release the valve member which is actuated by its spring to shut off the air blast.

The cutting devices will now be described in the order in which they are actuated into engagement with the work piece. It will be understood, however, that this order may be varied or that all the cutters may be actuated simultaneously, or that one or more of them may be omitted and its function performed by others without departing from the spirit of the invention. The inner groove cutter 13 and the means for operating it are best shown in Figs. 1, 3, 4 and 5. The cutter 13 is constructed of a thin piece of steel or other suitable material bent in the form of a bow, or U-shaped, and having its ends secured to a block 61. The block 61 is mounted on a rock shaft 62 carried in the end of an arm 63 which curves upwardly and outwardly and then extends downwardly, and at its lower end is mounted on one end of a rock shaft 64 journalled in an arm 65 projecting inwardly from a post or support 66 mounted on the table 21. At its other end, the rock shaft 64 has one end of an arm 67 secured thereto, the other end of which is pivotally connected with a link 68 which extends downwardly through a slot or opening 69 in the table 21, see Fig. 25, and at its lower end is pivoted to a follower 68' which has a lug or roller 70 journalled thereon which engages and rests on a cam 71 secured to the cam shaft 31. The follower 68' is pivoted to the frame of the machine or a bracket secured thereto at one end, and at its other end is connected to the frame by a spring 69' which resiliently maintains it in engagement with the periphery of the cam. The form of the cam 71 is illustrated in dotted lines in Figs. 1 and 3, its normal position when the cutter is inoperative being shown in Fig. 1.

The other end of the rock shaft 62 is secured to an arm 72 which curves upwardly, outwardly and downwardly, and at its outer end is pivoted to the end of a link 73 which is bent upwardly and forwardly, and is then bent to extend downwardly through a slot or opening 74 in the table 21, and at its lower end is pivoted to a follower 73' provided with a lug or roller 75 which engages the periphery of a cam 76 on the cam shaft 31. The follower 73' is pivoted at one end to the frame of the machine or a bracket thereon, and at its other end is connected to said frame by a spring 74' which resiliently maintains the follower in engagement with the periphery of the cam.

Assuming the cutter 13 to be in its normal inoperative position, with the cams 71 and 76 in the position shown in Fig. 1 and the cam shaft 31 disconnected from its driving mechanism, the lever 38 is actuated to start rotation of the cam shaft and the cams mounted thereon in the direction indicated by the arrows. The link 68 drops suddenly, swinging the arm 67 and with it the arm 63 and the cutter 13 from the Fig. 1 position to the Fig. 3 position and into engagement with the work piece. Referring to Figs. 3 and 4, it will be noted that the cutter first engages the work piece at 77, a point adjacent the base of the lower skirt 8 of the insulator. As the cams continue to rotate, the cutter moves inwardly and downwardly to the Fig. 4 position, and then outwardly to the Fig. 5 position in an arc to form the inner groove of the upper skirt. During this movement, the cutter swings on its arm 63 to describe the curve of the groove under the action of the cam 76 through the link 73 and arm 72 to the Fig. 5 position, when it is again withdrawn from the work piece.

As shown in Fig. 4, the cutter 13 leaves a shoulder at the point 77 on the outer surface of the skirt 8. The cutter 14, best shown in Figs. 6 to 10 and 25, is provided for removing this shoulder and finishing the surface of the lower skirt. The cutter 14 is also U-shaped and has its arms secured in parallel relation to opposite sides of a block 78, pivoted at 79 on the lower end of an arm 80. The upper end of the block 78 is bifurcated to engage opposite sides of a stop 81 on the arm 80 for limiting the pivotal movement of the cutter thereon, and if desired, the block may be provided with adjustable screws, as shown, for varying the swinging movement of the cutter in one direction or the other.

The arm 80 is slidably mounted in a housing or guideway 81' mounted on a post 82' secured to the table 21. The movements of the cutter are controlled by a cam 82 on the cam shaft 31 through a series of levers comprising a follower in the form of a lever 83 pivoted at one end to the frame of the machine and at its other end to a link 84. Intermediate its ends, said lever 83 has a lateral projection 85 having an anti-friction roller which rests upon and engages the periphery of the cam 82. The link 84 extends upwardly from the follower 83 through a slot or opening 86 in the table 21, and at its upper end is pivotally connected with one arm of a bell crank lever 87 pivoted on the post 82', the other arm of which is connected by a link 88 with an arm 89 fixed to the block 78. Rotation of the cam 82 from the normal position of rest shown in full lines in Fig. 6 at first moves the follower 83 very slowly if at all, during which time the cutter 14 moves into engagement with the work piece. Due to the form of cam 82, the movement of the follower increases with the rotation and swings the bell crank lever 87 to move the cutter toward and into engagement with the work piece to the position shown in Fig. 7 and in dotted lines in Fig. 6. Further movement of the cam permits the follower to drop toward the axis of the cam shaft to swing the bell crank lever 87 in the opposite direction to withdraw the cutter from the work piece when the cam completes its cycle of rotation.

If desired, a spring 91 may connect the follower with a fixed part of the machine to resiliently maintain the follower in engagement with the periphery of the cam and insure the complete return of the cutter to normal position. By comparison of Fig. 10, which shows the cutter at the limit of its cutting stroke, with Fig. 8, which shows the position of the cutter just before its movement toward initial position, it will be noted that the swinging movement of the bell crank 87 first swings the cutter on its pivot to relieve it from the work piece and then to slide it in its guide from the work piece to the initial position shown in Fig. 9.

The outer groove 12 of the skirt 6 is formed in the work piece by the cutter 15, which follows the cutter 14 into engagement with the work piece and is best seen in Figs. 11, 12, 13 and 14 of the drawings. The cutter 15 is similar in construction to the cutter 14 and comprises a strip or band of steel or other suitable material bent to a U-shape and having its opposite ends secured to the opposite sides of a block 100. Its mounting and operation is somewhat similar to the mounting and operation of the cutter 13. The block 100 is secured to one end of a rock shaft 101 mounted in the end of an arm 102. The arm 102 curves upwardly, outwardly and downwardly, terminating in a straight downwardly extending portion, the lower end of which is fixed on the end of a rock shaft 103. The shaft 103 is mounted in an arm 104 extending inwardly from a post or support 105 mounted on the table 21. The other end of the shaft 103 has an arm 106 secured thereto at one end, the other end of which is pivoted to the upper end of a link 107. The link 107 extends downwardly through an opening in the table 21, and at its lower end is pivoted to a follower 109 having a projection 110 which rides upon and engages the periphery of a cam 111, also mounted on the cam shaft 31. If desired, the projection 110 may be provided with an anti-friction roller, as shown. The follower 109 is pivoted at one end in a bracket 112 on the frame, and has its other end connected to the frame by means of a spring 113 which operates to resiliently maintain the projection 110 thereon in contact with the periphery of the cam 111.

The other end of the shaft 101 has an arm 114 secured thereto at one end and pivoted at its other end to the upper end of a link 115. The link 115 extends downwardly through an opening 116 in the table 21, and at its lower end is pivoted to a follower 117 having a lug or projection 118 which rides on and engages the periphery of a cam 119 also mounted on the shaft 31. If desired, the projection 118 may also be provided with an anti-friction roller, as indicated in the drawings. The follower 117 is also pivoted at one end in the bracket 112 and its other end is connected by a spring 120 with the frame, said spring operating to resiliently maintain the projection 118 in engagement with the periphery of the cam 119.

The normal inoperative position of the cutter 15 is shown in Fig. 11, from which it will be noted that during the initial rotation of the cams, very little if any motion is imparted to the followers 109 and 117 so that no movement is imparted to the cutter during this initial movement of the cam shaft. During this time, however, the cutters 13 and 14 are moved to operate on the work piece, and the cam 111 then acts to move the follower 109 to turn the rock shaft 103 to swing the cutter 15 into cutting engagement with the work piece to the position shown in Fig. 13 to cut the outer groove in the skirt 6 of the insulator. The follower 117 then begins to move to actuate the arm 114 to swing the cutter inwardly to the Fig. 14 position to properly shape the groove and finally the cams return both followers and cutter to the initial position of Fig. 11.

The insulator or work piece now has substantially the form shown in Fig. 14, and to complete it to the form shown in Fig. 28, it is necessary to round off the edges of the skirts 6 and 8 and the edge of the flange 20 between the newly cut grooves 11 and 12 of the skirt 6. The cutters 16, 17 and 18 are provided for this purpose, and are best illustrated in Figs. 15 to 23, 25 and 26 of the drawings. The cutter 16 is provided for rounding off the lower edge of the skirt 8 and is constructed in a manner similar to those previously described. Said cutter comprises a thin strip or band of steel or other suitable material, U-shaped in form and having its ends secured to opposite sides of the end of an arm 122, projecting from an arm or block 123. The block 123 is mounted on one end of a stub shaft 124 rotatably mounted in a head 125, and having a wheel or pulley 126 secured to its other end. The arm 122 is eccentric to the axis of the shaft 124 so that rotation of the shaft imparts a revolving or swinging movement to the cutter about the axis of the shaft as a center when the wheel or pulley 126 is rotated. Adjustable means are provided for limiting the movement of the block and cutter in opposite directions. Said means comprises a pair of set screws or bolts 127 and 128 threaded in a bracket 129 mounted on the head 125 and held in adjusted position in the bracket by means of lock nuts, as shown, see Fig. 18. The head 125 is mounted on the upper end of a tool carrier in the form of a rod or shaft 130 slidably mounted in a hollow post 131 projecting upwardly from the table 21. At its lower end, the rod 130 carries a wheel or pulley 132 for a purpose presently to be described.

The cutter 17 which operates on the flange between the inner and outer grooves is constructed of a strip of steel or other suitable material bent in the form of a hook, or is substantially U-shaped, having one leg cut off short and the other leg secured to the free end of an arm 133. The arm 133 is bent in the form shown in Figs. 19 and 20 so that the cutter is eccentric to its axis and has a bearing in a block 134 mounted on a post 135 arranged on a bracket 136 secured to the rod 130. The other end of the arm 133 has a wheel or pulley 137 secured thereto for a purpose to be described below. Adjustable means are also provided for limiting the rotation of the arm 133 in opposite directions. To this end, a collar 138 is secured to the arm and has a stop finger 139 projecting outwardly therefrom and adapted to engage one or another of the stops 140 or 141 arranged in its path and constructed in the form of bolts or set screws threaded in the opposite ends of a cross-arm or bracket 142 arranged on the block 134.

The cutter 18, which is adapted to finish the outer edge of the skirt 6, is constructed in a manner similar to the cutter 17 and mounted on the end of an arm 143. At its other end, the arm 143 is secured to an arm or block 144 mounted on a rock shaft 145. The rock shaft 145 has a bearing in a block 146 and at its other end has a wheel in the form of a double pulley 147 secured thereto. The block 146 is mounted on a post 146' also arranged on the bracket 136. It will be noted that the arm 143 is eccentric to the axis of the rock shaft 145 so that the cutter swings or revolves in a curve about the center of said shaft. Adjustable means are also provided for limiting the movement of the cutter 18 in opposite directions. Said means comprises a stop in the form of a set screw or bolt 148 threaded in the bracket 136 and arranged in the path of the block 144. A lock nut 149 may be threaded on the screw 148 for securing it in adjusted position. Another stop 150 also in the form of a set screw or bolt is threaded in the arm 143 and secured in adjusted position by means of the lock nut 151. Said stop 150 engages the bracket 136 to limit the movement of the block in the other direction.

It will be noted that each of the cutters 16, 17 and 18 are eccentric to an axis about which they revolve in an arc of a circle from the position shown in full lines in Fig. 16 to the position shown in Fig. 17 to trim the edges of the skirts and the flange 20 in neatly rounded surfaces. These cutters are moved as a unit into engagement with the work piece and are actuated simultaneously to produce the surfaces cut by them. The means for actuating this group of cutters will now be described.

Revolubly mounted on an arm 152 projecting from the bracket 136 is a wheel or pulley 153 which operates as an idler for changing the direction of a flexible endless belt or cord 154, the course of which is clearly shown in Fig. 22. From an inspection of this figure, it will be noted that the belt extends downwardly and under the pulley 132, then upwardly and over the pulley 147, thence to and over the pulley 137, from the pulley 137 downwardly and under the idle pulley 153, and thence around the pulley 147 to and over the pulley 126. The belt 154 is actuated by cam controlled means adapted to move it limited distances in opposite directions to rock the shafts 124, 133 and 145, and comprising a follower 155 operatively connected to the belt. The follower 155 is pivoted at one end to the frame of the machine and at or adjacent its other end carries an angular bracket 156, see Fig. 23, having one arm connected to the follower and another arm forming one member of a cord clamping device 157 and having a shallow groove adapted to receive the cord 154. Cooperating with the clamping member 157 is a clamping member 158 having a similar cord engaging groove and connected to the clamping member 157 by screws or other suitable means whereby the cord is clamped between them.

The bracket 156 is secured to an arm 161 suspended from the follower on a bolt 160 and at its lower end carries a weight 162 which tends to maintain the arm 161 in a vertical position and to swing the free end of the follower downwardly under the action of gravity and also to pull with it the endless belt 154 which is clamped thereto. The follower 155 has a projection or lug 163 thereon whereby it is supported on and engages the periphery of a cam 164 fixed on the cam shaft 31. If desired, the lug 163 may be provided with an anti-friction roller, as indicated in Fig. 15 of the drawings. From an inspection of said figure, it will be noted that the cam 164 is substantially circular throughout the greater part of its periphery so that at the beginning of its rotation and throughout the greater portion thereof, no movement is imparted to the follower 155 or the endless belt 154 controlled thereby. During this time, the cutters 13, 14 and 15 are brought into action to operate on the work piece to form the grooves 11 and 12. A sharp depression in the cam is then met by the follower, first to permit it to drop from the position shown in Fig. 15 under the action of the weight 152 to move the endless belt in one direction to swing or revolve the cutters actuated thereby in one direction, and then to raise the follower to move the belt and swing the cutters back to normal position.

The cutters 16, 17 and 18 when normally inoperative occupy the position shown in Fig. 25 away from the work piece, means being provided for turning or swinging them to the position shown in Fig. 26 to engage the work piece before the follower 155 and parts controlled thereby are brought into action. To this end, a bent arm 166 is secured at one end to the lower end of the rod 130, the other end of which is pivoted to a link 167 which connects it with one end of a follower 168 pivoted at its other on the frame of the machine. The follower is connected by the spring 169 with the frame of the machine, which spring operates to resiliently maintain a lug or projection 170 thereon resiliently in engagement with the periphery of the cam 54.

The lug or projection 170 may be provided with an anti-friction roller bearing, as indicated in the drawings, if desired. In the arrangement illustrated, the wheel 26 is in the path of the follower 168, which may have a portion cut away, as shown, to avoid engagement therewith. The form of the cam 54 is clearly shown in Figs. 1, 15 and 24, and is so formed that during the initial part of its rotation, very little if any movement is imparted to the follower 168, and during this time the cutters 13, 14 and 15 operate on the work piece. During continued rotation of the cam, the follower moves along the part 171 and swings the arm 166 to turn the rod 130 and swing the cutters toward the work piece from the Fig. 25 to the Fig. 26 position, or to the position shown in dotted lines in Fig. 16. When the shoulder 172 reaches the lug on the follower, further movement thereof takes place to swing the cutters into position to engage the work piece. In the meantime, the cam 164 has reached a point to permit movement of the follower 155, the initial movement of which permits the rod 130 and the cutters mounted thereon to drop from the Fig. 15 position to that shown in Fig. 21, in which the head or bracket 136 engages and rests on the top of the hollow post 131. This movement moves the cutters downwardly from the position shown in dotted lines in Fig. 16 to the horizontal planes of the full line position. The combined action of the cams 54 and 164 moves them to the full line position in said figure. Further downward movement of the follower 155 by the action of the cam 164 moves the endless belt 154 clamped thereto to turn the pulleys and revolve the cutters, while held in engagement with the work piece by the cam 54, from the position shown in full lines in Fig. 16 to the position shown in Fig. 17 to complete the operations on the work piece. Further rotation of the cams returns the parts to normal position.

As stated above, the downward movement of the rod 130 is limited by the engagement of the head or bracket 136 with the upper end of the hollow post 131. Said rod is held in the normal elevated position supported by the follower 155 through the weight 162 suspended therefrom. To this end, a bolt 165 is threaded in a bracket 173 on the weight and projects upwardly therefrom and engages the lower end of the bracket 174 on the lower end of the rod 130, and in which the pulley 132 is mounted, when the follower 155 approaches the limit of its upward movement and carries the rod 130 with it. The bolt or screw 165 may be adjusted on the bracket to vary the extent of movement imparted to the rod 130. It will be noted that the shafts 124 and 145 are arranged substantially parallel with each other at right angles to the axis of the rod or carrier 130, while the axes of the pulleys 137 and 153 are inclined relatively thereto.

Briefly described, the operation is as follows: The work piece comprising an insulator blank of plastic clay or other suitable material of the form shown in Fig. 27 is mounted in the work holder or chuck 3. The operator then engages the lever 29 with his foot to engage the driving wheel 25 with the driven wheel 26 to turn the chuck and with it the work piece. He then pushes the hand piece 45 rearwardly, which closes the clutch to operatively connect the cam shaft 31 with the driven pulley 34. When the lever 38 moves past the end of the locking member 47, its spring 48 swings it to the right, as seen in the drawings, moving it under the lever 38 in position to engage the lever and maintain the cam shaft 31 operatively connected with the pulley 34 to be driven thereby. At the same time, the dog 51 is carried to the right, as viewed in the drawings, with the member 47 moving its right hand end into engagement with the valve 58 to open the valve and permit the flow of air on to the work piece from the nozzles 56, while the finger 52 is moved into the path of the projection 53 on the cam 54. When the cam 54 approaches the end of one complete revolution, during which time all the cams on the cam shaft 31 turn in unison to actuate the various cutters, as previously explained, to complete the operations on the work piece, the projection 53 engages the finger 52 and moves it and the locking member 47 to the left and releases the lever 38 to permit it to be moved, as described, to open the clutch to stop rotation of the shaft 31. If for any reason it becomes desirable to stop the cam shaft 31 before it has made a complete rotation, the locking member 47 may be moved from engagement with the lever 38 by actuating the hand piece 50.

The various surfaces formed on the work piece by the cutters is a result of the form of the various cutters themselves combined with the combination of movements imparted thereto by the various cams. By constructing the cutters of thin material, such as steel, they are easily bent to the desired curved form and offer the minimum resistance to the plastic material of the work piece, and hence there is little liability of distorting or injuring the same.

Although only one embodiment of the invention is shown and described herein, it will be understood that parts may be omitted therefrom or rearranged, and that this application is intended to cover such changes or rearrangements without departing from the spirit of the invention or scope of the following claims.

We claim:

1. In an insulator forming machine, the combination of a frame, a work holder revolubly mounted in the frame, a plurality of cutters, automatically actuated means for moving said cutters to and from operative engagement with a work piece on said work holder, and means controlled by said automatic means for stopping the same when the operations on a work piece are complete.

2. In an insulator forming machine, the combination of a frame, a work holder rotatably mounted in the frame, means for rotating the work holder, a plurality of cutters, means comprising a shaft for automatically moving the cutters to and from operative engagement with the work piece, a wheel for turning the shaft, a clutch for operatively connecting the shaft with said wheel, and means for automatically releasing said clutch when the cutters are moved from operative engagement with the work piece.

3. In an insulator forming machine, the combination of a frame, a work holder rotatably mounted in the frame, means for rotating the work holder, a plurality of cutters, means comprising a shaft for automatically moving the cutters to and from operative engagement with the work piece, a wheel for turning the shaft, a clutch for operatively connecting the shaft with said wheel, a hand operated lever for closing said clutch, a locking member for engaging said lever to maintain the clutch closed, and means on said shaft for automatically releasing said locking member from engagement with said lever.

4. In an insulator forming machine, the combination of a frame, a work holder rotatably mounted in the frame, means for rotating the work holder, a plurality of cutters, means comprising a shaft for automatically moving the cutters to and from operative engagement with the work piece, a wheel for turning the shaft, a clutch for operatively connecting the shaft with said wheel, a hand operated lever for closing said clutch, a locking member for engaging said lever to maintain the clutch closed, means for moving said locking member to locking position, an arm on said locking member, and means on said shaft movable into engagement with said arm to move the locking member from locking position.

5. In an insulator forming machine, the combination of a frame, a work holder rotatably mounted in the frame, means for rotating the work holder, a plurality of cutters, means comprising a shaft for automatically moving the cutters to and from operative engagement with the work piece, a wheel for turning the shaft, a clutch for operatively connecting the shaft with said wheel, a hand operated lever for closing said clutch, a locking member for engaging said lever to maintain the clutch closed, means for moving said locking member to locking position, and separate means for manually moving said locking member to release the hand operated lever.

6. In an insulator forming machine, the combination of a frame, a work holder rotatably mounted in the frame, means for rotating the work holder, a plurality of cutters, means comprising a shaft for automatically moving the cutters to and from operative engagement with the work piece, a wheel for turning the shaft, a clutch for operatively connecting the shaft with said wheel, a hand operated lever for closing said clutch, a pipe for conducting compressed air to the work piece, a shut-off valve in said pipe, and automatically operated devices for opening said valve when the hand operated lever is actuated to close said clutch.

7. In an insulator forming machine, the combination of a frame, a work holder rotatably mounted in the frame, means for rotating the work holder, a plurality of cutters, means comprising a shaft for automatically moving the cutters to and from operative engagement with the work piece, a wheel for turning the shaft, a clutch for operatively connecting the shaft with said wheel, a hand operated lever for closing said clutch, a pipe for conducting compressed air to the work piece for blowing out the chips produced by the cutters, a shut-off valve in said pipe, a locking member movable to retain the hand operated lever in position to maintain the clutch closed, and means on said locking member for opening said valve when the locking member moves to locking position.

8. In an insulator forming machine, the combination of a frame, a work holder revolubly mounted thereon, means for revolving said work holder, a cutter, a swinging arm on which said cutter is mounted, means for swinging said arm to move the cutter to and from operative engagement with a work piece on the work holder, a second arm operatively connected with the cutter, and means for moving the second arm to swing the cutter on the first arm while the cutter operatively engages the work piece.

9. In an insulator forming machine, the combination of a frame, a work holder revolubly mounted thereon, means for revolving said work holder, a cutter, a swinging arm on which said cutter is mounted, means for swinging said arm to move the cutter to and from operative engagement with a work piece on the work holder, a second arm operatively connected with the cutter, a revoluble shaft, and means operated by said shaft for swinging said first arm to move the cutter into engagement with the work piece and the second arm to swing the cutter on the first arm while the cutter operatively engages the work piece.

10. In an insulator forming machine, the combination of a frame, a work holder revolubly mounted thereon, means for revolving said work holder, a cutter, a swinging arm on which said cutter is mounted, a fixed support on which said swinging arm is mounted, a follower, means operatively connecting said swinging arm with said follower, a revoluble cam shaft, and a cam on said shaft operatively engaging said follower to swing the cutter to and from operative engagement with a work piece on the work holder.

11. In an insulator forming machine, the combination of a frame, a work holder revolubly mounted thereon, means for revolving said work holder, a cutter, a swinging arm on which said cutter is mounted, a fixed support on which said swinging arm is mounted, a follower, means operatively connecting said swinging arm with said follower, a revoluble cam shaft, a cam on said shaft operatively engaging said follower to swing the cutter to and from operative engagement with a work piece on the work holder, a second arm operatively connected with the cutter for swinging it on the first mentioned arm, a follower operatively connected with said second arm, and a second cam on said cam shaft operatively engaged by said follower for actuating the second arm to swing the cutter on the first mentioned arm.

12. In an insulator forming machine, the combination of a frame, a work holder revolubly mounted thereon, means for turning said work holder, a cutter, a rock shaft on which the cutter is mounted, a swinging arm in which the rock shaft is carried, an arm secured to said rock shaft, means for actuating said arm to turn the rock shaft and swing the cutter, and separate means for actuating said swinging arm to swing the cutter to and from operative engagement with the work piece.

13. In an insulator forming machine, the combination of a frame, a work holder revolubly mounted thereon, means for rotating said work holder, a cutter, a rock shaft on which the cutter is mounted, a swinging arm in which the rock shaft is carried, a second rock shaft on which said swinging arm is mounted, a fixed support in which said second rock shaft is revolubly mounted, means operatively connected with said second rock shaft for swinging the shaft and with it the arm to move the cutter to and from operative engagement with the work piece, an arm on said first mentioned rock shaft, and means operatively connected with said last mentioned arm for turning the rock shaft to swing the cutter while engaged with the work piece.

14. In an insulator forming machine, the combination of a frame, a work holder revolubly mounted on the frame, means for rotating the work holder, a support projecting from the frame, a cutter slidably mounted on said support, a bell crank pivoted on said support, means operatively connecting the bell crank with the cutter, a revoluble cam, a follower cooperating therewith, and means operatively connecting said follower with the bell crank for swinging the bell crank to move the cutter to and from operative engagement with a work piece on the work holder.

15. In an insulator forming machine, the combination of a frame, a work holder revolubly mounted on the frame, means for rotating the work holder, a support projecting from the frame, a rod slidably mounted on said support, a cutter pivoted on said rod, a bell crank lever pivoted on said support, means operatively connecting said bell crank lever with the cutter, and means for actuating said bell crank lever to swing the cutter on said rod and slide the rod on its support to move the cutter to and from operative engagement with a work piece on the work holder.

16. In an insulator forming machine, the combination of a frame, a work holder revolubly mounted on the frame, means for rotating the work holder, a support projecting from the frame, a rod slidably mounted on said support, a cutter pivoted on said rod, means for limiting the pivotal movement of the cutter, an arm on the cutter, a bell crank lever pivoted on said support, means operatively connecting said bell crank lever with said arm, and means for actuating said bell crank lever to swing the cutter on said rod and slide the rod on its support to move the cutter to and from operative engagement with a work piece on the work support.

17. In an insulator forming machine, the combination of a frame, a work holder revolubly mounted in said frame and adapted to receive a work piece in the form of an insulator blank having a skirt, a cutter for forming a groove in said skirt, means for moving said cutter into operative engagement with the work piece and in another direction to form the groove, and a plurality of cams for controlling said moving means.

18. In an insulator forming machine, the combination of a frame, a work holder revolubly mounted on the frame, a carrier arranged substantially parallel with the axis of the work holder revolubly mounted on the frame and movable axially thereon, a plurality of cutters on said carrier, and separate means for rotating the carrier and moving it axially to operatively engage the cutters with a work piece on the work support.

19. In an insulator forming machine, the combination of a frame, a work holder revolubly mounted on the frame, an axially movable carrier revolubly mounted on the frame, a plurality of arms projecting laterally from said carrier, cutters on said arms, cam controlled means for turning the carrier to swing the cutters toward the work piece, and separate means for moving the carrier axially to operatively engage the cutters with the work piece.

20. In an insulator forming machine, the combination of a frame, a work holder revolubly mounted on the frame, an axially movable carrier revolubly mounted on the frame, a plurality of revoluble arms on said carrier, cutters on said arms, means for turning the carrier to swing the cutters toward the work piece, and separate means for moving the carrier axially to move the cutters into engagement with the work piece and revolving the arms to move the cutters while operatively engaging the work piece.

21. In an insulator forming machine, the combination of a frame, a work holder revolubly mounted on the frame, an axially movable carrier revolubly mounted on the frame, a plurality of revoluble arms on said carrier, cutters on said arms, means operatively connecting said arms for turning them simultaneously, means for turning the carrier to swing the cutters toward the work piece, and separate means for moving the carrier axially to move the cutters into engagement with the work piece and revolving the arms to move the cutters while operatively engaging the work piece.

22. In an insulator forming machine, the combination of a frame, a work holder revolubly mounted on the frame, an axially movable carrier revolubly mounted on the frame, a plurality of revoluble arms on said carrier, cutters on said arms, pulleys on said arms, flexible means connecting said pulleys for rotating them, means for turning said carrier, and separate means for moving the carrier axially to engage the cutters with the work piece and the flexible means to turn the pulleys.

23. In an insulator forming machine, the combination of a frame, a work holder revolubly mounted on the frame, an axially movable carrier revolubly mounted on the frame, a plurality of revoluble arms on said carrier, cutters on said arms, pulleys on said arms, flexible means operatively connecting said pulleys for rotating them, cam controlled means for rotating said carrier, and separate cam controlled means for moving the carrier axially and the flexible means to turn the pulleys.

24. In an insulator forming machine, the combination of a frame, a work holder revolubly mounted on the frame, an axially movable carrier revolubly mounted on the frame, a plurality of revoluble arms on said carrier, cutters on said arms, a cam, a follower operatively engaging said cam, means connecting the follower with said carrier for turning the latter, and separate means for moving the carrier axially and turning the arms thereon.

25. In an insulator forming machine, the combination of a frame, a work holder revolubly mounted on the frame, an axially movable carrier revolubly mounted on the frame, a plurality of revoluble arms on said carrier, cutters on said arms, pulleys on said arms, flexible means arranged on said pulleys for turning the arms, means for turning the carrier to move the cutter toward the work holder, a follower for moving the carrier axially and operatively connected to the flexible means, and a revoluble cam operatively engaged by said follower for moving the follower to move the carrier axially and actuate said flexible means to turn the arms.

26. In an insulator forming machine, the combination of a frame, a work holder revolubly mounted in said frame, a carrier movable on said frame, a shaft revolubly mounted on said carrier, an arm on said shaft eccentric thereto and arranged substantially parallel to its axis, and a cutter carried on said arm.

27. In an insulator forming machine, the combination of a frame, a work holder revolubly mounted in said frame, a carrier movable on said frame, a shaft revolubly mounted on said carrier, a pulley on said shaft, means operatively connected with said pulley for turning the shaft, an arm on said shaft eccentric thereto and arranged substantially parallel with its axis, and a cutter carried on said arm.

28. In an insulator forming machine, the combination of a frame, a work holder revolubly mounted in said frame, a carrier movable on said frame, a shaft revolubly mounted on said carrier, a pulley on said shaft, an arm on said shaft eccentric thereto and arranged substantially parallel with its axis, a cutter on said arm, means operatively connected with said pulley for turning the shaft in opposite directions, and means for limiting the rotation of the shaft in opposite directions.

29. In an insulator forming machine, the combination of a frame, a work holder revolubly mounted in said frame, a carrier movable on said frame, a shaft revolubly mounted on said carrier, a pulley on said shaft, an arm on said shaft eccentric thereto and arranged substantially parallel with its axis, a cutter on said arm, flexible means operatively connected with said pulley for turning the shaft, a follower operatively connected with said flexible means, and a revoluble cam for controlling the movements of said follower.

30. In an insulator forming machine, the combination of a frame, a work holder revolubly mounted in said frame, a carrier movable on said frame, a shaft revolubly mounted on said carrier, a pulley on said shaft, an arm on said shaft eccentric thereto and arranged substantially parallel with its axis, a cutter on said arm, flexible means operatively connected with said pulley for turning the shaft, a pivoted follower operatively connected with said flexible means, gravity means for moving said follower, and a revoluble cam for controlling the operation of said gravity means.

31. In an insulator forming machine, the combination of a frame, a work holder revolubly mounted in the frame, a cutter, automatically actuated means for moving said cutter to and from operative engagement with a work piece on the work holder, and separate automatically actuated means for moving the cutter while operatively engaged with the work piece.

32. A machine for shaping a multiple flanged one-piece insulator comprising a frame and work holder revolubly mounted thereon, a plurality of cutters movable successively in a downward and inwardly inclined path for cooperation with surfaces between the flanges, and automatically operated means controlling such successive movements of the cutters.

33. A machine for shaping multiple flanged one-piece insulators comprising a frame and a work holder revolubly mounted thereon, a cutter movable inwardly between the flanges of the insulator and at the same time in a downward direction to form a groove in one of the flanges, and power driven means acting automatically to guide and actuate the cutter to form such groove.

34. A machine for shaping multiple flanged insulators comprising a frame and a work holder revolubly mounted thereon, means for rotating the work holder, a support projecting from the frame, a rod slidably movable in said support in an angular direction with reference to the rotary axis of the work holder, a cutter mounted on said rod, and means for automatically moving the rod to and from operative engagement with a work piece.

35. A machine for shaping multiple flanged insulators comprising a frame and a work holder revolubly mounted thereon, a cutter movable downwardly and inwardly between the flanges and operative to form the outer surface of the lower flange during the first part of its travel and a groove in the upper flange during the latter part of its travel, and means acting automatically to control the movement of said cutter.

36. In an insulator forming machine, the combination of a frame, a work holder revolubly mounted on the frame, means for rotating the work holder, a support projecting from the frame, a rod inclined relatively to the axis of the work holder and slidably mounted in said support for reciprocating movement into and out of cutting position, a cutter pivotally mounted on said rod to swing about a horizontal axis, and means connected to the cutter for reciprocating said rod and tilting the cutter to move the latter to and from operative engagement with a work piece on the work holder.

37. In an insulator forming machine, the combination of a frame, a work holder revolubly mounted on the frame, means for rotating the work holder, a support projecting from the frame, a rod slidably mounted in said support for reciprocating movement into and out of cutting position, a cutter pivotally mounted on said rod to swing about a horizontal axis, a lever pivoted on said support, means operatively connecting the lever with the cutter, and means for actuating said lever to reciprocate the rod on its support and tilt the cutter to and from operative engagement with a work piece on the work holder.

LEO B. HARVEY.
LUCIUS L. FRENCH.